United States Patent Office 3,749,791
Patented July 31, 1973

3,749,791
FLUORINE OR CHLORINE-SUBSTITUTED 2,2-BIS(TRIFLUOROMETHYL) - 1,3 - DIOXOLANE ANESTHETICS
Ross C. Terrell, Plainfield, and George L. Moore, South Plainfield, N.J., assignors to Airco, Inc.
No Drawing. Filed July 15, 1971, Ser. No. 163,112
Int. Cl. A61k 27/00
U.S. Cl. 424—278
10 Claims

ABSTRACT OF THE DISCLOSURE

The disclosure is of fluorine or chlorine-substituted 2,2-bis(trifluoromethyl)-1,3-dioxolanes having the formula:

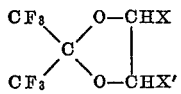

in which X is Cl or F, and X' is H, Cl or F, with the proviso that when X is Cl, X' is H or F. These compounds are useful as anesthetics and as solvents and dispersants for fluorinated materials.

---

This invention relates to fluorine or chlorine-substituted 2,2-bis(trifluoromethyl)-1,3-dioxolanes having the formula:

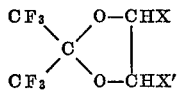

in which X is Cl or F, and X' is H, Cl or F, with the proviso that when X is Cl, X' is H or F, and their use in producing analgesia and anesthesia in anesthetic-susceptible, air-breathing mammals. These compounds are also useful as solvents and dispersants for fluorinated materials.

The compounds of this invention are nonflammable and soda lime stable, and are anesthetics for inhalation anesthetic-susceptible mammals. These compounds are readily miscible with other organic liquids including fats and oils and have useful solvent properties, for example as solvents for fluorinated olefins and other fluorinated materials such as fluorowaxes. The substituted dioxolanes of this invention can be used to prepare pastes and dispersions of such fluorine-containing materials, useful for coatings and the like, and can be employed as degreasing agents.

The compounds of the present invention can be prepared through chlorination, fluorination or stepwise chlorination and fluorination of 2,2-bis(trifluoromethyl)-1,3-dioxolane. The starting material

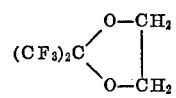

is known; see U.S. Pats. No. 2,925,424 to Simmons and No. 3,314,850 to Gilbert. In the chlorination of 2,2-bis-(trifluoromethyl)-1,3-dioxolane, the composition of the product can be controlled by the reaction parameters and the rate of addition of chlorine. The extent of chlorination can be monitored by determining the amount of hydrogen chloride which is liberated during the reaction. The hydrogen chloride can be collected in a water scrubber which is titrated with standard base to determine the amount of hydrogen chloride evolved. In preparing

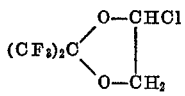

the chlorination can be carried out until 0.5 mole of hydrogen chloride is detected per mole of

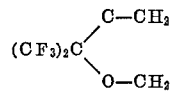

reacted, and by increasing the amount of chlorine added the 4,5-dichloro-containing products can be prepared. This dichloro-product can be fluorinated to obtain the product

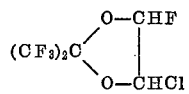

The chlorination of 2,2-bis(trifluoromethyl)-1,3-dioxolane should be carried out in either a fully or paratially transparent vessel so that photo energy can be supplied to the reaction. Suitable sources of photo energy are incandenscent, ultraviolet, and fluorescent lamps, and even strong sunlight. In view of the ready availability, low cost and ease of handling of incandescent lamps, they are preferred for use as the illumination source.

The chlorination reaction can be accomplished by bubbling gaseous chlorine into the liquid 2,2-bis(trifluoromethyl)-1,3-dioxolane while it is strongly illuminated. The chlorine is added at the same rate at which it reacts, which can be determined by checking for chlorine vapor in the effluent from the chlorinator. The reaction is exothermic so cooling water should be supplied to the chlorination apparatus to control the reaction. The chlorination can be carried out at temperatures of about −25 to 0° C. Following the chlorination, the reaction mixture can be separated by fractional distillation or by vapor phase chromatography.

In order to prepare the monofluoro-substituted 2,2-bis-(trifluoromethyl)-1,3-dioxolanes, a quantity of 2,2-bis-(trifluoromethyl)-4-chloro - 1,3 - dioxolane or 2,2-bis(trifluoromethyl)-4,5-dichloro-1,3-dioxolane, prepared, for instance, in the previously described manner, can be reacted with HF in a reaction vessel that will not be attacked by the HF; a stainless steel, copper, nickel, or platinum vessel would be quite suitable. In the alternative, the fluorination can be effected with a fluorinating agent such as antimony trifluoride and in the presence of a catalytic amount of pentavalent fluoride or chloride such as antimony pentafluoride or pentachloride. The fluorination reaction can be carried out by bubbling gaseous HF through the reaction mixture, by adding liquid HF or by adding solid SbF$_3$ to the mixture. The fluorination reaction is preferably carried out at about 0° C. or slightly therebelow. Higher or lower temperatures can be employed; however, it has been found that higher temperatures may produce undesirable reaction products while lower temperatures cause a slower rate of reaction.

The effluent from the fluorination apparatus can be passed through a water scrubber to collect the HCl which is formed during the reaction. The amount of HCl formed should be equivalent to the chlorine atoms exchanged for fluorine. Too little HCl evolved indicates incomplete exchange, while too much HCl indicates either overfluorination or decomposition. The fluorination should be continued until approximately one mole of HCl is collected for each mole of starting dioxolane reacted, indicating that one chlorine atom of the latter has been exchanged for fluorine. The desired reaction product can be readily separated from the reaction mixture by fractional distillation or gas chromatography.

The 4,5-difluoro product of this invention can be made by reaction of 2,2-bis(trifluoromethyl)-1,3-dioxolane with gaseous fluorine to replace one of the hydrogen atoms on each of the 4 and 5-carbon atoms of the feed material. This fluorination can be accomplished by mixing the feed compound with trichlorotrifluoroethane, carbon tetrachloride or other perhalogenated methane or ether solvent and then contacting the mixture with gaseous fluorine at reduced temperatures, e.g. up to about 0° C., preferably about −40 to 0° C. Hydrogen fluoride is evolved from the reaction mixture during this fluorination procedure and the HF can be collected by passage of the evolved gases through a water scrubber. After a substantial amount of the 2,2-bis(trifluoromethyl)-1,3-dioxolane has reacted, the desired products can be separated from the reaction mixture by fractional distillation and gas chromatography.

The following examples illustrate the preparation and use of the fluorine or chlorine-substituted 2,2-bis(trifluoromethyl)-1,3-dioxolanes of this invention.

EXAMPLE I

Preparation of 2,2-bis(trifluoromethyl)-4-chloro-1,3-dioxolane 2,2-bis(trifluoromethyl)-1,3-dioxolane (127 g.) was photo-chlorinated (incandescent light) by bubbling chlorine through the dioxolane at the rate at which it reacted at −15° C. A total of 0.56 mole of chlorine was reacted. From the crude product (143.5 g.) 86 g. of pure

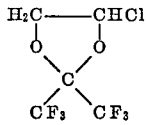

was obtained by preparative chromatography. The product analyzed as follows:

B.P.—116.5° C.
$n_D^{20}$—1.3391
Calculated for $C_5H_3ClF_6O_2$ (percent): F, 46.6; Cl, 14.5.
Found (percent): F, 46.4; Cl, 14.1.
Specific gravity—1.587
Vapor pressure—23.5 mm. Hg at 25° C.

EXAMPLE II

Preparation of 2,2-bis(trifluoromethyl)-4,5-dichloro-1,3-dioxolane

The procedure for making this compound was the same as in Example I except that 0.91 mole of chlorine was reacted with the 2,2-bis(trifluoromethyl)-1,3-dioxolane. By preparative chromatography, 32.0 g. of

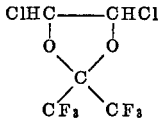

were obtained. This product had a mild odor and analyzed as follows:

B.P.—118° C.
$n_D^{20}$—1.3572
Calculated for $C_5H_2Cl_2F_6O_2$ (percent): F, 40.8; Cl, 25.4.
Found (percent): F, 41.2; Cl, 24.8.
Specific gravity—1.635
Vapor pressure—21.5 mm. Hg at 25° C.

EXAMPLE III

Preparation of 2,2-bis(trifluoromethyl)-4-chloro-5-fluoro-1,3-dioxolane 2,2-bis(trifluoromethyl)-4,5-dichloro-1,3-dioxolane (69 g.), prepared as in Example II, was placed in a stainless steel reactor and cooled to 0° C. Antimony pentachloride (11 g.) was added to the reactor. Anhydrous HF was added to the reactor until evolution of by-product HCl became slow, at which point the reaction was quenched by addition of cold water (400 ml.). The mixture was neutralized with KOH, followed by filtration of antimony salts. A heavy organic layer was separated and dried over $K_2CO_3$. Pure

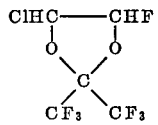

(25 g.) was isolated by preparative chromatography. The product analyzed as follows:

B.P.—95° C.
$n_D^{20}$—1.3252
Calculated for $C_5H_2ClF_7O_2$ (percent): F, 50.6; Cl, 13.5.
Found (percent): F, 50.6; Cl, 13.5.
Specific gravity—1.79
Vapor pressure—50 mm. Hg at 25° C.

EXAMPLE IV

Preparation of 2,2-bis(trifluoromethyl)-4-fluoro-1,3-dioxolane 2,2-bis(trifluoromethyl)-4-chloro-1,3-dioxolane (85 g.), prepared as in Example I, was treated with anhydrous HF in the presence of antimony pentachloride (4.2 g.) in a stainless steel reactor at −5° C. until the evolution of byproduct HCl became slow. The reaction was quenched by adding 300 ml. of cold water. The mixture was neutralized with KOH, filtered, and the heavy organic layer separated and dried over $K_2CO_3$. By preparative chromatography, 26 g. of pure

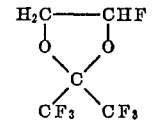

was obtained. The product had a faint camphor-like odor and analyzed as follows:

B.P.—102° C.
$n_D^{20}$—1.3044
Calculated for $C_5H_3F_7O_2$: F, 58.3%. Found: F, 58.4%.
Specific gravity—1.593
Vapor pressure—43 mm. Hg and 25° C.

EXAMPLE V

Preparation of 2,2-bis(trifluoromethyl)-4,5-difluoro-1,3-dioxolane 2,2-bis(trifluoromethyl)-1,3-dioxolane (105 g.) was placed in a 1-liter resin kettle. Freon 113 (trichlorotrifluoroethane) (about 900 ml.) was then added in sufficient volume to keep the free space in the reactor at a minimum. The mixture was fluorinated at −19° C. with 20% fluorine in argon for 5 hr. at a fluorine rate of 0.1 mole per hour. A 5-7° C. exotherm was observed throughout the reaction. The mixture was filtered, then stirred over $K_2CO_3$ until the vapors above the mixture no longer tested strongly acidic. After filtering, Freon 113 was removed by distillation. Pure

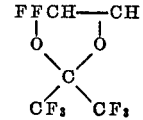

(11 g.) was isolated from the crude mixture by preparative chromotography. The product had a mild odor and analyzed as follows:

B.P.—78° C.
$n_D^{20}$—<1.300
Calculated for $C_5H_2F_8O_2$: F, 62.1%. Found: F, 60.9%
Specific gravity—1.600
Vapor presure—110 mm. Hg at 25° C.

In order to determine the usefulness of the fluorine or chlorine-containing 2,2 - bis(trifluoromethyl)-1,3-dioxolanes of this invention as inhalation anesthetics in respirable mixtures containing life-supporting amounts of oxygen, series of tests were carried out employing mice. The compounds tested were at least 99.5% pure as determined by vapor phase chromatography.

The compound 2,2-bis(trifluoromethyl)-4-chloro-1,3-dioxolane, for example, was administered to test mice by a standard procedure in which a measured quantity of the agent is placed in a laboratory jar and allowed to completely evaporate so as to give a calculated vapor concentration. The test mice are then quickly placed in the jar and observed. Anesthesia is determined by observing the righting reflex of the mice. In such tests the 2,2-bis(trifluoromethyl)-4-chloro-1,3-dioxolane induced anesthesia of the mice in 1 minute and 17 seconds at 0.5% vapor concentration. Excitement and leaping was observed in the induction. Recovery required 3 minutes and 38 seconds. Recovery time is measured beginning when the mice are transferred from the test jar to room air and ending when the mice are observed to be able to walk.

At 1.0% concentration, induction took 1 minute and recovery took 10 minutes, with the same excitement during induction being observed. At 2.5% concentration, induction was without excitement and required only 31 seconds, while recovery required 10 minutes. At all concentration levels respiration was depressed, the degree of respiration being proportional to the vapor concentration. Two of five test mice died during recovery from the 2.5% treatment.

Similar tests were conducted with 2,2-bis(trifluoromethyl)-4-fluoro-5-chloro-1,3-dioxolane. With 0.5% concentration of this agent, induction occurred at 2 minutes and 16 seconds and recovery at 34 seconds. At 1.0% concentration, induction took 1 minute and recovery took 1 minute and 50 seconds. At 2.0% concentration, induction time was down to 20 seconds and recovery time was 5 minutes and 30 seconds. Mild excitement with some kicking was observed during the induction periods and slight respiratory depression was noted with the larger two concentration. Some anelgesia was induced at the 1% concentration. None of the mice died.

2,2-bis(trifluoromethyl)-4-fluoro-1,3-dioxolane was also tested in the above manner. With 1.0% concentration of this agent, induction occurred, with excitement, after 1 minute and 6 seconds and recovery required 1 minute and 22 seconds. With 1.5% concentration, induction time was 30 seconds, excitement was mild, recovery time was 2 minutes and 43 seconds, and respiration was slowed and gasping occurred during the anesthesia. At 2.5% concentration, induction time was 20 seconds and recovery time was 6 minutes and 32 seconds; respiration was progressively depressed during the anesthesia and three of 5 test mice died.

Using 2,2 - bis(trifluoromethyl)-4,5-difluoro-1,3-dioxolane as the test compound, 2.5% vapor concentration produced a light anesthesia with limb movements throughout. The mice were excitable during recovery. At 5.0% concentration, induction required 30 seconds and recovery took 3 minutes and 48 seconds. There was a brief period of excitement during the induction period and respiration was very labored during anesthesia and into the recovery period, giving the appearance that respiration was obstructed. Again the mice were excitable during recovery. None of the mice died.

The dioxolanes of this invention exhibit anesthetic properties in inhalation anesthetic-susceptible mammals, and lend themselves to effective use as inhalant anesthetics in respirable mixtures containing life-supporting concentrations of oxygen. The effective amounts of the compounds of this invention to be employed depend on the level of anesthetia to which the mammal is to be brought, the rate at which anesthesia is to be induced, and the length of time over which anesthesia is to be maintained. Minor volume percentages of the compounds from a fraction of a percent, e.g. at least about 0.5, up to several percent, e.g. up to about 5% or more, can be used in respirable mixtures containing life-supporting amounts of oxygen. The person controlling the anesthesia can regulate the amount and gradually increase the amount until the desired plane of anesthesia is reached. By then monitoring the physical reactions of the mammal, as is the usual procedure, the duration and plane of anesthesia can be readily controlled.

It should be understood that the foregoing disclosure relates only to preferred embodiments of the invention and that it is intended to cover all changes and modifications of the invention which do not constitute departure from the spirit and scope of the invention.

What is claimed is:

1. An inhalant anesthetic composition comprising an inhalant anesthetic agent and oxygen in suitable proportions for use as an anesthetic, said anesthetic agent being of the formula

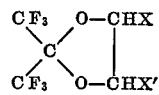

in which X is chlorine or fluorine and X' is hydrogen, chlorine or fluorine, with the proviso that when X is chlorine, X' is hydrogen or fluorine.

2. The composition of claim 1 in which the anesthetic agent has the formula:

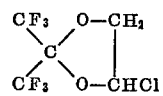

3. The composition of claim 1 in which the anesthetic agent has the formula:

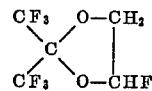

4. The composition of claim 1 in which the anesthetic agent has the formula

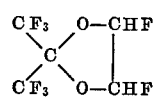

5. The composition of claim 1 in which the anesthetic agent has the formula

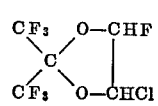

6. The method of anesthetizing a warm-blooded, air-breathing mammal which comprises administering by inhalation to said mammal an anesthetically-effective amount of an anesthetic agent while administering life-supporting amounts of oxygen, said anesthetic agent being of the formula:

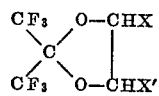

in which X is chlorine or fluorine and X' is hydrogen, chlorine or fluorine, with the proviso that when X is chlorine, X' is hydrogen or fluorine.

7. The method of claim 6 in which the anesthetic agent has the formula:

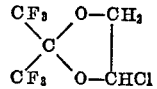

8. The method of claim 6 in which the anesthetic agent has the formula:
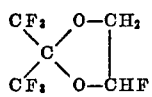
9. The method of claim 6 in which the anesthetic agent has the formula:
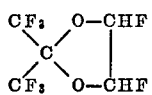
10. The method of claim 6 in which the anesthetic agent has the formula:
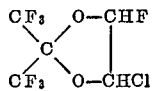
References Cited
Larsen, Fluorine Chemistry Reviews, vol. 3, (1969), p. 39.
JEROME D. GOLDBERG, Primary Examiner
U.S. Cl. X.R.
260—340.9